United States Patent [19]

Stieferman

[11] Patent Number: 5,544,685

[45] Date of Patent: Aug. 13, 1996

[54] FILL CONTROLLER FOR LIQUIFIED GAS CONTAINER AND APPARATUS FOR FILLING TANK USING SAME

[75] Inventor: Dale M. Stieferman, Jefferson City, Mo.

[73] Assignee: Keifer Controls, Inc., Orlando, Fla.

[21] Appl. No.: 300,154

[22] Filed: Sep. 2, 1994

[51] Int. Cl.$^6$ .................. B65B 1/30; B65B 3/28
[52] U.S. Cl. .................. 141/198; 141/95; 137/429
[58] Field of Search .................. 141/95, 198, 18; 73/319, 306, 307, 308; 137/429

[56] References Cited

U.S. PATENT DOCUMENTS

| | | | |
|---|---|---|---|
| 4,304,271 | 12/1981 | Mowatt-Larssen | 141/198 |
| 4,313,459 | 2/1982 | Mylander | 141/198 |
| 4,483,367 | 11/1984 | Ross et al. | 137/416 |
| 4,491,016 | 1/1985 | Haefiner | 73/302 |
| 4,787,427 | 11/1988 | Bacroix et al. | 141/198 |
| 4,881,581 | 11/1989 | Hollerback | 141/113 |
| 5,025,827 | 6/1991 | Weng | 137/429 |
| 5,144,517 | 9/1992 | Wieth | 361/55 |
| 5,233,231 | 8/1993 | Wieth et al. | 307/116 |
| 5,246,045 | 9/1993 | Clothier et al. | 141/198 |

*Primary Examiner*—Henry J. Recla
*Assistant Examiner*—Steven O. Douglas
*Attorney, Agent, or Firm*—Standley & Gilcrest

[57] ABSTRACT

An electronic sensor and fill controller for use with a refillable liquid gas container is disclosed. The present invention in broadest terms comprises a valve body for the container, a shaft extending from the valve body into the container, an electronic sensor disposed on the shaft, and a controller adapted to initiate, terminate or alter an electrical signal once the sensor senses contact with the liquified gas. In a preferred embodiment, the invention comprises a float switch and fill controller for use with a refillable LG container, comprising: (a) a shaft adapted to extend into said container so as to be substantially opposed to the pull of gravity on said container; (b) a float slidably attached to the shaft, the float moveable between a first position to a second position as the liquified gas container is charged with a liquified gas; (c) a valve body adapted to be sealingly attached to the container so as to close the container, the valve body having a liquified gas passage therethrough and a valve adapted to control the flow of a liquified gas through the liquified gas passage; (d) a electronic sensor positioned so as to sense the movement of the float from the first position to a second position, the sensor comprising an electric signal generator adapted to send an electrical signal; and (e) a controller adapted to perform at least one function selected from the group consisting of: (i) initiate an electrical signal upon sensing that the float has moved to one of the first and second positions; (ii) terminate an electrical signal upon sensing that the float has moved to one of the first and second positions; and (iii) alter an electrical signal upon sensing that the float has moved to one of the first and second positions.

17 Claims, 6 Drawing Sheets

5,544,685

FILL CONTROLLER FOR LIQUIFIED GAS CONTAINER AND APPARATUS FOR FILLING TANK USING SAME

TECHNICAL FIELD

The present invention pertains to the field of liquified gas dispensing and to containers for liquified gas.

BACKGROUND

Liquified gases (LGs) are used in a wide variety of applications. Perhaps the most common use of liquified gas is the use of liquified propane gas (LPG) from relatively small tanks in gas grills, mobile homes, and the like, where LPG is typically dispensed into tanks for localized use from larger municipal or commercial sources.

The handling of LPG can be hazardous due to the combined dangers of handling material that is both dispensed under pressure and flammable.

As well as the safe handling of LPG, it is typically necessary to be able to measure the amount of gas dispensed. This task is often complicated by the effects of ambient temperature, etc. on the accuracy of such measurements. Dispensing LPG under relatively cool temperatures followed by the transfer of the LPG tank to a relatively warmer environment can cause a tank to rupture or discharge gas through an over-pressure valve. This effect can be exacerbated by the inaccurate measurement of LPG upon filling, which can leave a substantial volume of the tank left filled with gas subject to the effects of Charles Law. In contrast, allowing fill to continue until the tank is full creates the risk of valve rupture or over-pressure release. Thus, accurately and safely minimizing gas space in an LPG tank is desirable so as to reduce or eliminate the described hydrostatic effect.

Presently, common practice is to fill tanks and measure the gas by weight, while knowing the density of the LPG. This technique is prone to error and thus does not consistently result in a given tank being charged to capacity while minimizing gas space in the tank.

Gas discharge not only poses the danger of ignition and fire or explosion, it also creates a form of air pollution by the release of organic volatiles into the atmosphere.

Strictly mechanical devices, using floats and seals, have been applied to the present problem, but these devices can have high failure rates.

Accordingly, it is desirable to be able to safely, accurately and reliably dispense and measure LPG into a tank container while minimizing the gas space left in the charged tank.

Although described against the backdrop of problems associated with LPG, it will be understood that the present invention may be applied to the dispensing and measurement of any LG.

In view of the present disclosure or through practice of the present invention, other advantages, or the solution to other problems, may become apparent to one of ordinary skill.

SUMMARY OF THE INVENTION

The present invention is an electronic sensor and fill controller for use with a refillable liquid gas container. The present invention in broadest terms comprises a valve body for the container, a shaft extending from the valve body into the container, an electronic sensor disposed on the shaft, and a controller adapted to initiate, terminate and/or alter an electrical signal once the sensor senses contact with the liquified gas.

The sensor may be any sensor capable of measuring the level of the liquified gas in the container, preferably a level indicator such as a reed switch. It is preferred that the sensor be made so as to be integral with the valve body. The sensor may also be any of a variety of sensors capable of detecting the presence, at its location, of a liquified gas. Such sensors may be those adapted to detect the presence of a liquified gas through differences in light transmission, such as by absorbance or refractive index. Other sensors may include those adapted to sense the presence of a liquified gas through differences in electrical conductants, such as through differences in the dielectric constant.

It is preferred that the controller be adapted to control the power of the electrical signal. This may be done by any number of electronic circuit means or other wise, preferably as described below.

It is also preferred that the valve body additionally comprises a pressure relief valve.

The present invention, in a preferred embodiment comprises a valve and fill controller for use with a refillable LG container, comprising: (a) a shaft adapted to extend into said container so as to be substantially opposed to the pull of gravity on said container; (b) a float slidably attached to the shaft, the float moveable between a first position to a second position as the liquified gas container is charged with a liquified gas; (c) a valve body adapted to be sealingly attached to the container so as to close the container, the valve body having a liquified gas passage therethrough and a valve adapted to control the flow of a liquified gas through the liquified gas passage; (d) a electronic sensor positioned so as to sense the movement of the float from the first position to a second position, the sensor comprising an electric signal generator adapted to send an electrical signal; and (e) a controller adapted to perform at least one function selected from the group consisting of: (i) initiate an electrical signal upon sensing that the float has moved to one of the first and second positions; (ii) terminate an electrical signal upon sensing that the float has moved to one of the first and second positions; and (iii) alter an electrical signal upon sensing that the float has moved to one of the first and second positions.

The present invention also includes an apparatus for filling a liquified gas container from a source of liquified gas, the apparatus contains the electronic sensor and fill controller described above, and comprises: (a) source of a liquified gas; (b) a liquified gas conduit in liquified gas conductive connection with the source of liquified gas; (c) a pump adapted to pump liquified gas through the liquified gas conduit into the liquified gas container; (d) a shaft adapted to extend into the container so as to be substantially opposed to the pull of gravity on the container; (e) a float slidably attached to the shaft, the float moveable between a first position to a second position as the liquified gas container is charged with the liquified gas; (f) a valve body adapted to be sealingly attached to the container so as to close the container, the valve body having a liquified gas passage therethrough and a valve adapted to control the flow of a liquified gas through the liquified gas passage; (g) a electronic sensor positioned so as to sense the movement of the float from the first position to a second position, the sensor containing an electric signal generator adapted to send an electrical signal, the sensor adapted to perform at least one function selected from the group consisting of: (i) initiate an electrical signal upon sensing that the float has moved to one of the first and second positions; (ii) terminate an electrical signal upon sensing that the float has moved to one of the first and second positions; and (iii) alter an electrical signal upon sensing that the float has moved to one of the first and second positions.

DETAILED DESCRIPTION OF THE PREFERRED EMBODIMENT

In accordance with the foregoing summary, the following presents a detailed description of the preferred embodiment of the present invention which is also considered to be its best mode.

Figure 1:
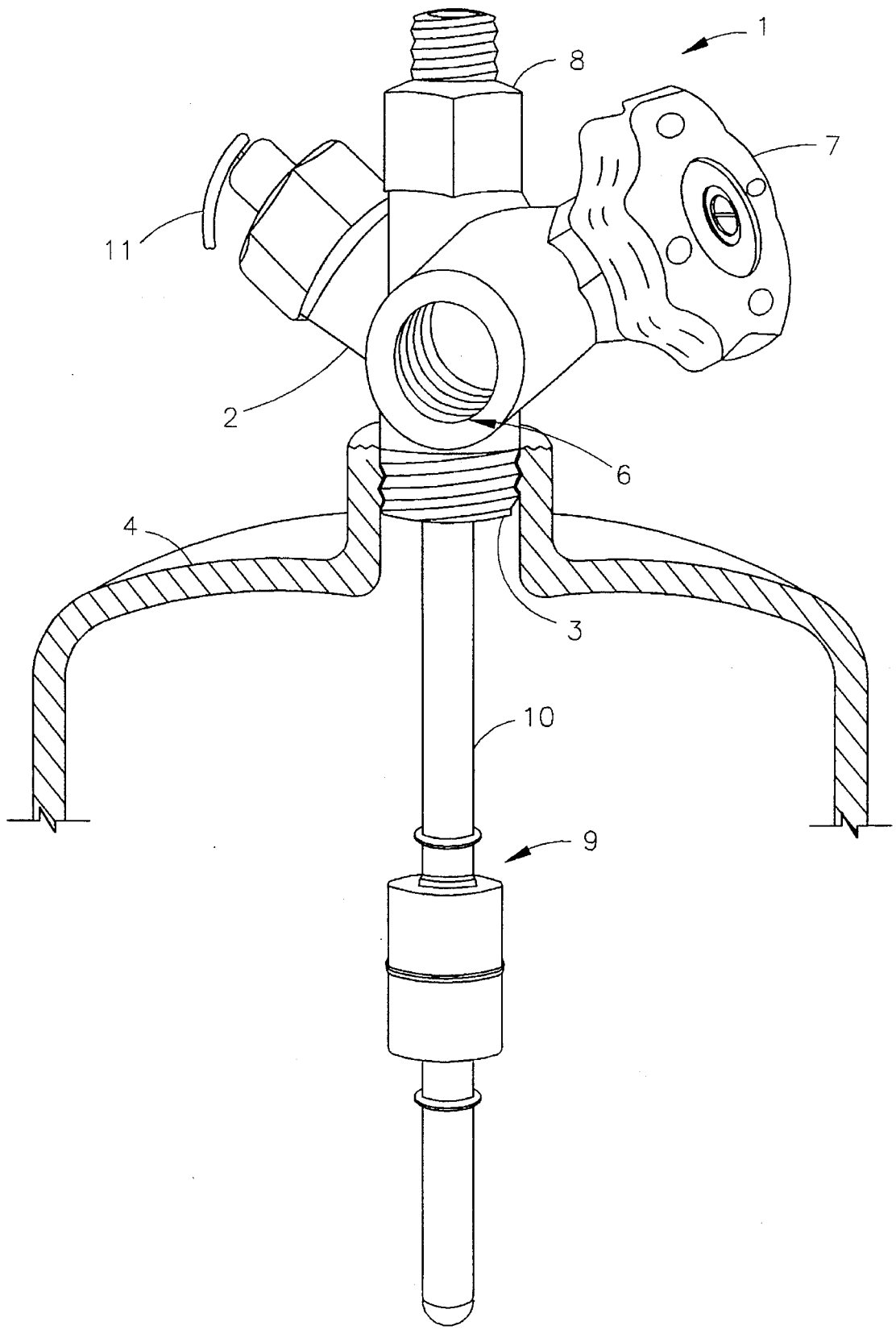
FIG. 1 is a perspective view of a fill controller with float switch in accordance with one embodiment of the present invention.

FIG. 1 shows a fill controller in accordance with the preferred embodiment of the present invention. FIG. 1 shows fill controller valve 1 comprising valve body 2 with threaded attachment 3, which is adapted to be attached to an opening in an LPG tank 4. Valve body 2 also contains opening 6 which is adapted to receive a fitting from an LPG fill hose. Valve body 2 also has attached thereto valve control handle 7 which controls the flow of the LPG into tank 4. Valve body 2 also has sensor adaptor 8 which is adapted to receive an electrical contact which communicates with float switch 9 mounted on shaft 10. Shaft 10 and float switch 9 are positioned so as to descend into tank 4 to a level where it is desired to sense the level of the liquified gas. FIG. 1 also shows that valve body 2 contains optional pressure relief valve 11.

Figure 2:
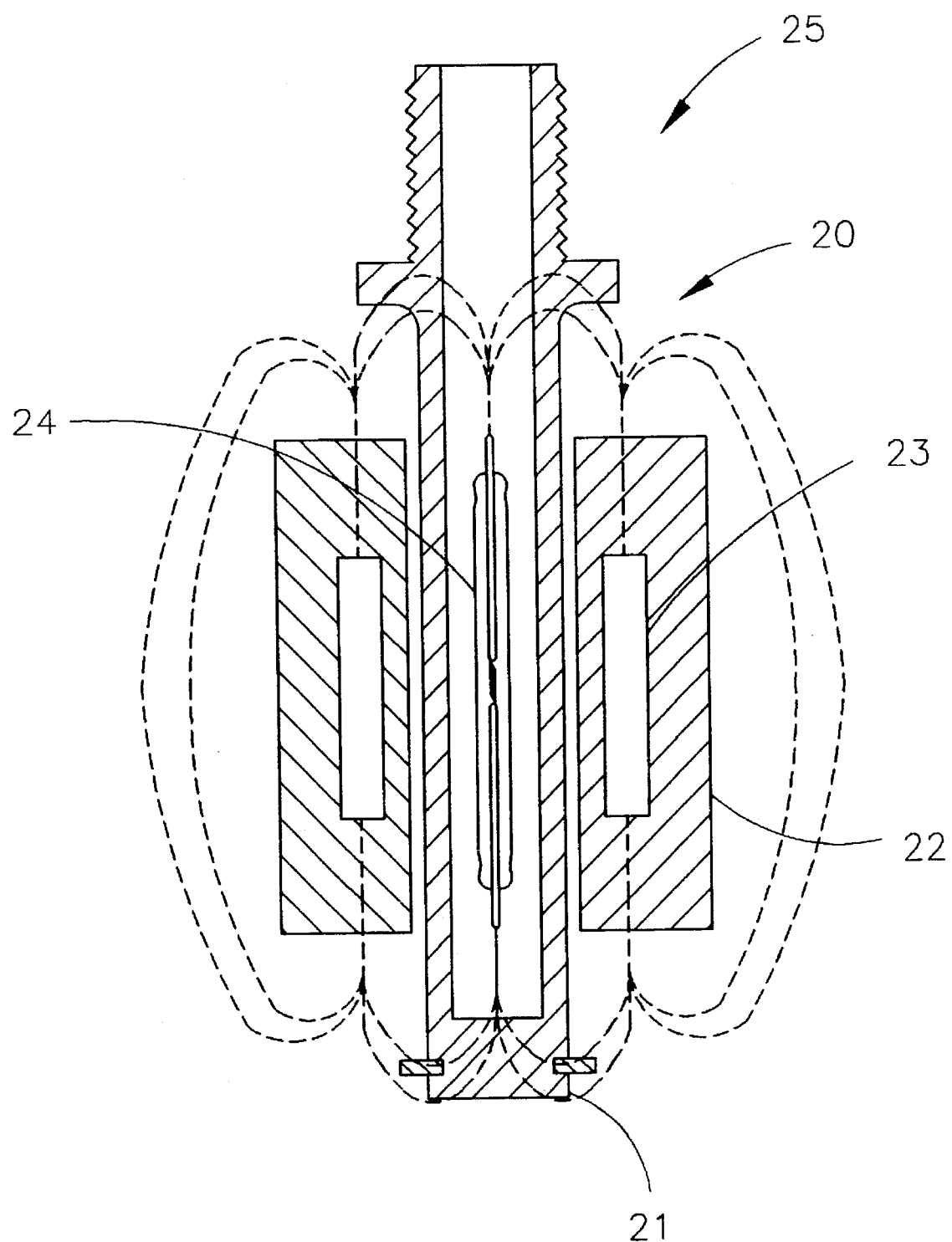
FIG. 2 is a cross section of the float switch shown in FIG. 1.

FIG. 2 shows a cross section of a float switch such as item 9 in FIG. 1. FIG. 2 shows float switch 20 which is mounted on shaft 21 and which comprises float 22 and permanent magnetic 23. Also shown in FIG. 2 is hermetically Sealed reed switch 24 and threaded fitting 25 which may be attached to threaded attachment 3 shown in FIG. 1.

Figure 3:
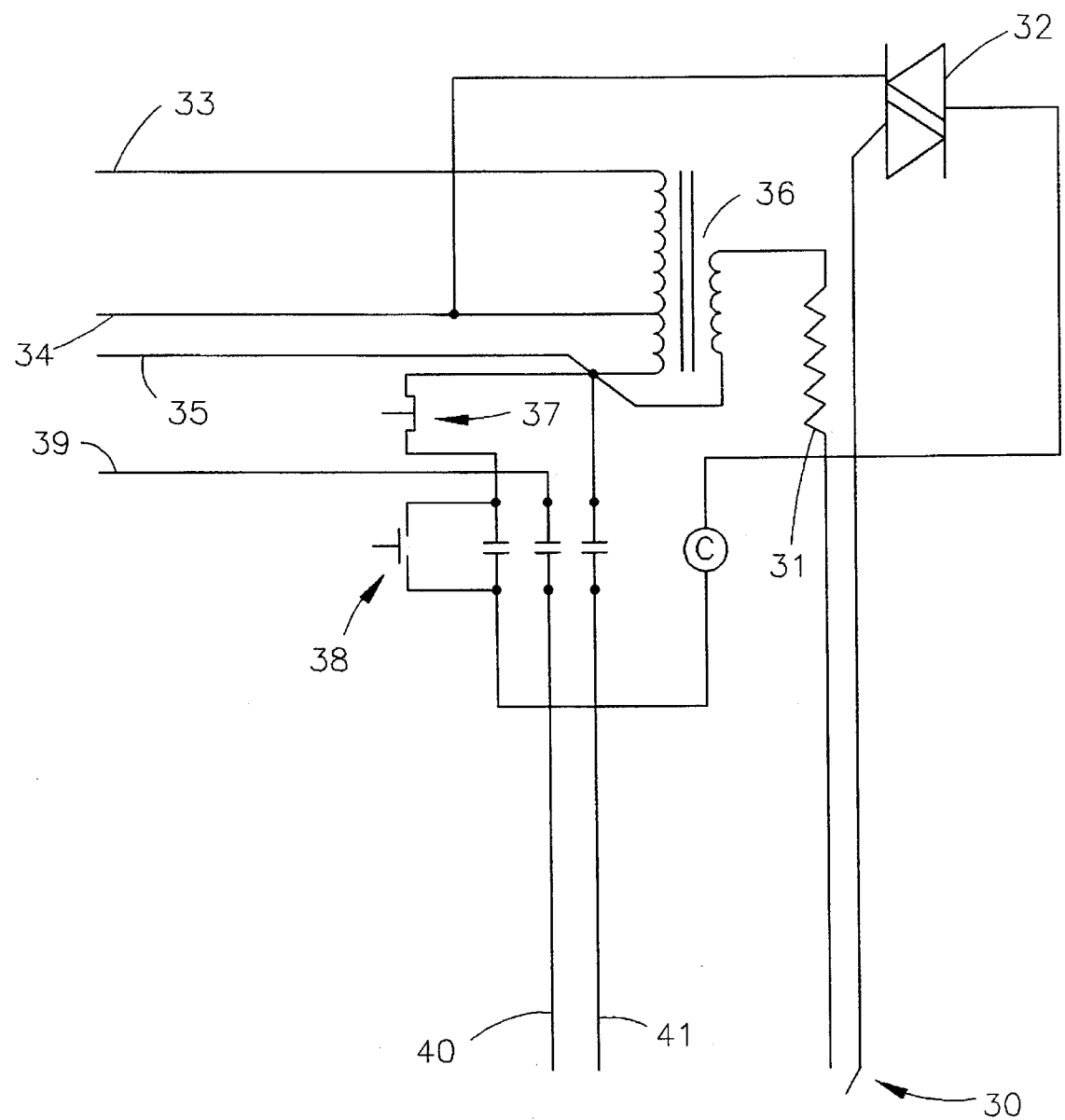
FIG. 3 is an electrical schematic of an electrical controller portion of a fill controller in accordance with one embodiment of the present invention.

FIG. 3 shows an electrical schematic of a controller which may be used in accordance with the present invention. FIG. 3 shows the contact of the vessel switch 30 which in turn is connected to resistor 31 and triac 32. This particular controller may be used with 240 volt or 110 volt sources for which leads 33 and 34 are used, respectively. Also shown in FIG. 3 is common lead 35 and transformer 36. Also shown is stop switch 37 and start 38 which are connected to a relay of capacitors $C_1$, $C_2$ and $C_3$. When the supply Voltage is 240 volts, lead 39 is connected to lead 33. When the supply voltage is 120 volts, lead 39 is connected to lead 34. Leads 40 and 41 are connected to the electrical load.

Figure 4:
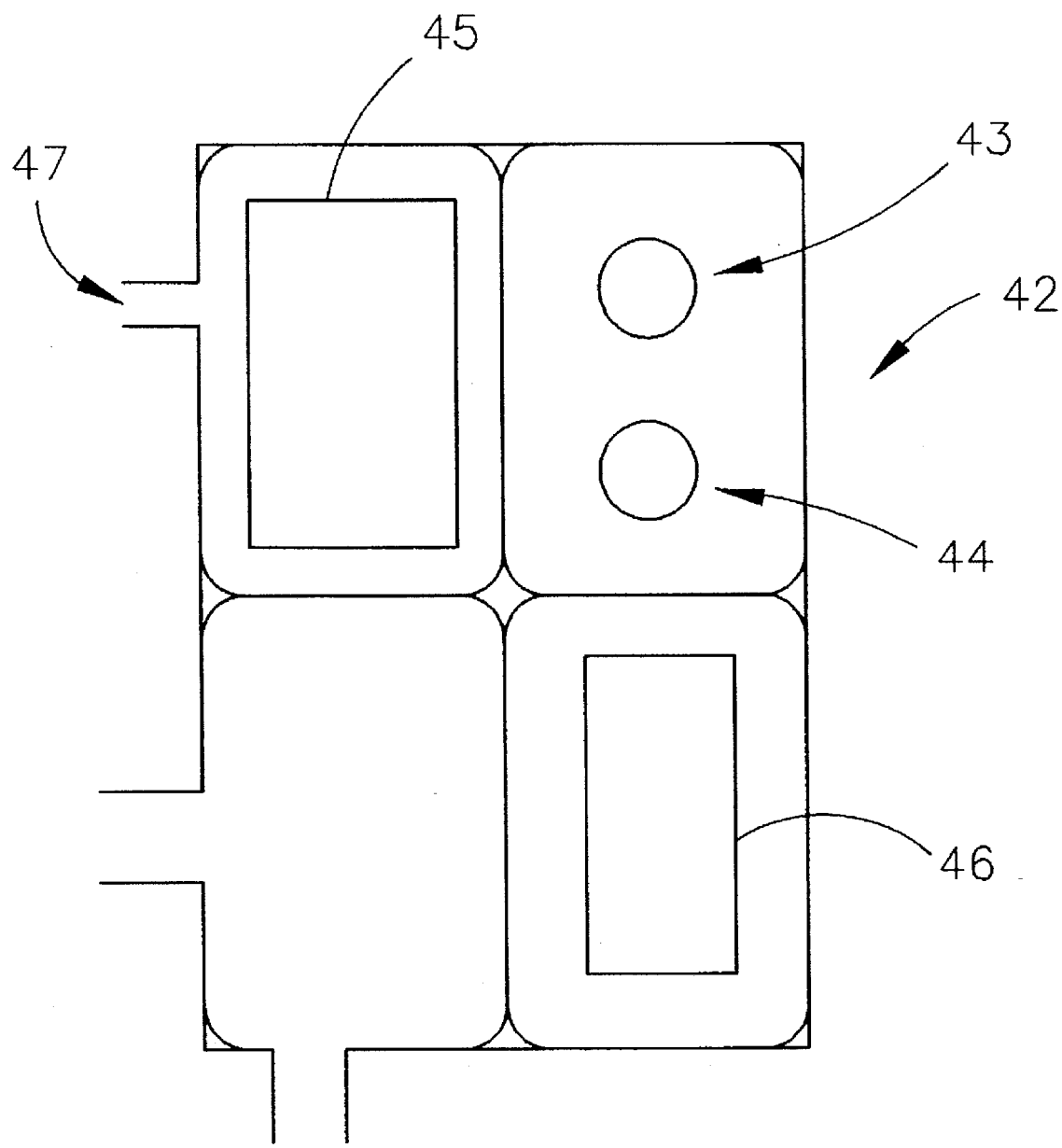
FIG. 4 is a control display which may be used in accordance with one embodiment of the present invention.

FIG. 4 shows switching display 42 which has start switch 43 and stop switch 44. Also shown in FIG. 4 is the solid state electrical circuit board 45 and relay 46. The power in may be 120 volts or 240 volts. The sensor cord extending from point 47 is connected to the tank when filling. Power may be supplied to the motor, valve or other control.

Figure 5:
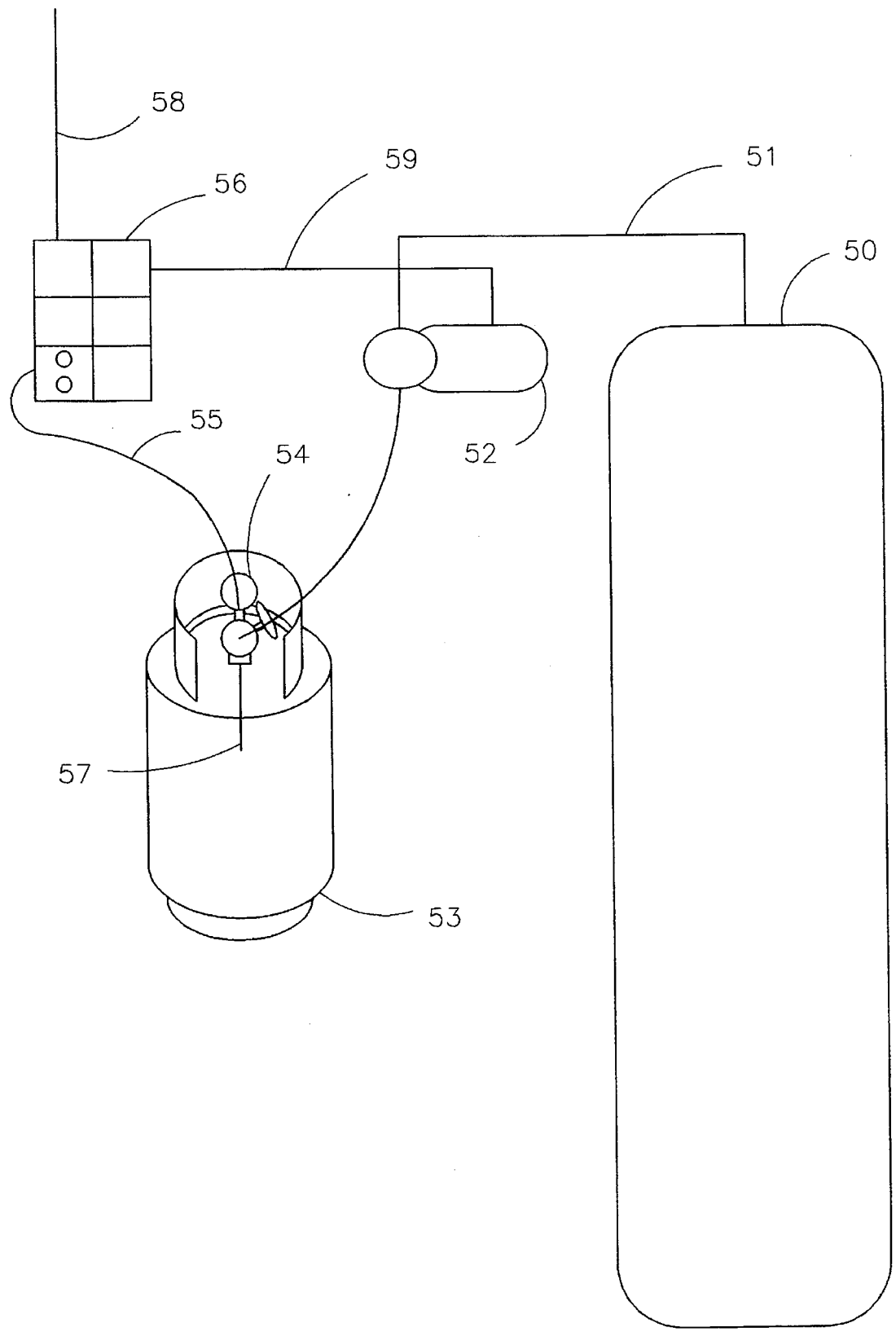
FIG. 5 is a schematic diagram of an apparatus for filling a liquified gas container in accordance with one embodiment of the present invention.

FIG. 5 shows a schematic diagram of an LPG fill apparatus in accordance with one embodiment of the present invention. Shown in FIG. 5 is a source of LPG, such as tank 50 which has fluid piping 51 communicating with fill pump 52. Fill pump 52 is used to transfer the product from the storage tank 50 to the smaller tank 53. Also shown in FIG. 5 is the fill controller valve 54 which has sensor cord 55 extending from it to the electrical controller 56, the wiring diagram of which is shown in FIG. 3. The display of control 56 is shown in FIG. 4. Also seen in FIG. 5 is the sensor shaft 57 which extending into tank 53. Such a shaft may be one such as item 10 in FIG. 1. Also connecting to controller 56 is power feed conduit 58 and feedback wiring 59 which connects to fill pump 52. When the sensor (mounted on shaft 57) in the tank senses a liquid, signal is sent to the controller which in turn turns off the pump 52 thereby stopping the flow of LPG from storage tank 50 to smaller tank 53. Controller 56 sends an electrical signal through electrical conduit 59 which stops the flow of LPG from source tank 50 to smaller tank 53, such as by disconnecting the power to pump 52, closing a valve, etc.

Figure 6:
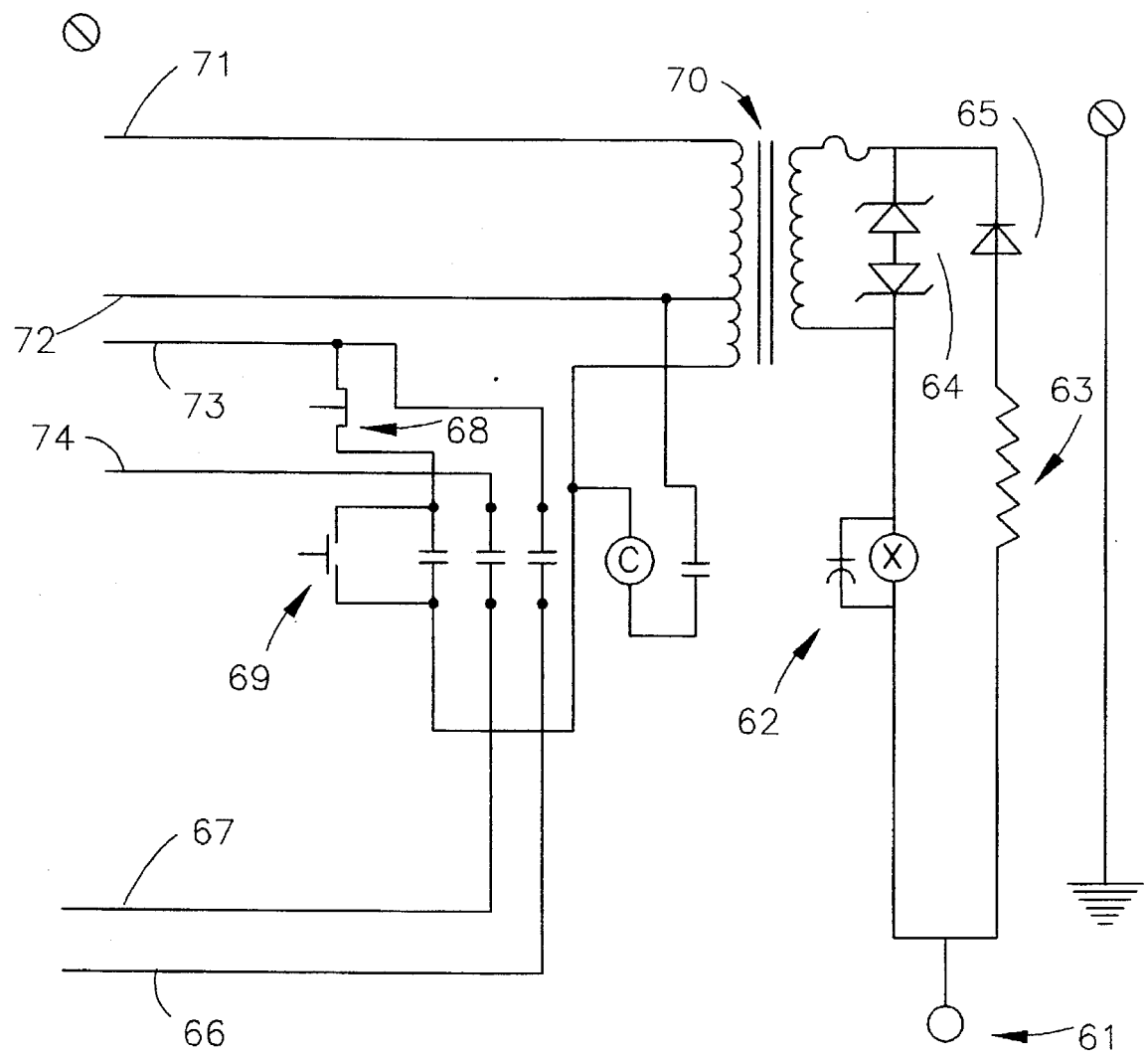
FIG. 6 is an electrical schematic of an electrical controller portion of a fill controller in accordance with another embodiment of the present invention.

FIG. 6 shows an electrical schematic of a controller which may be used in accordance with the present invention. FIG. 6 shows sensor 61 which is connected to capacitor 62 and resistor 63. These elements are in turn connected to transient suppression diodes 64 and 65. Also shown are leads 66 and 67 which are attached to an electrical load. Stop switch 68 and start switch 69 control the electrical circuit. FIG. 6 also shows transformer 70 which is supplied by lead 71 (for 240 volt current) and lead 72 (for 110 volt current). Lead 73 is a common lead and lead 74 is connected to lead 71 when the voltage is 240 volts, while lead 74 is connected to lead 72 when the voltage supply is 120 volts.

In accordance with the foregoing disclosure and/or through practice of the present invention, it will be within the ability of one of ordinary skill to make modifications or alterations to the present invention described herein in order to practice the invention without departing from its scope as reflected in the appended claims.

What is claimed is:

1. An electronic sensor and fill controller for use with a refillable liquified gas container, said controller comprising:
    a. a valve body adapted to be sealingly attached to said container so as to close said container, said valve body having a liquified gas passage therethrough and a valve adapted to control the flow of a liquified gas through said liquified gas passage;
    b. a shaft attached to and extending coaxially from said valve body so as to extend into said container;
    c. a float actuated electronic sensor disposed on said shaft, said electronic sensor adapted to sense the presence of said liquified gas; and
    d. a controller adapted to perform, upon said electronic sensor sensing contact with said liquified gas, at least one function selected from the group consisting of:
        i. initiating an electrical signal;
        ii. terminating an electrical signal; and
        iii. altering an electrical signal.

2. A float switch and fill controller according to claim 1 wherein said controller is adapted to control the power of said electrical signal.

3. A float switch and fill controller according to claim 1 wherein said valve body additionally comprises a pressure relief valve.

4. A float switch and fill controller for use with a refillable liquified gas container, comprising:
   a. a valve body adapted to be sealingly attached to said liquified gas container so as to close said liquified gas container, said valve body having a liquified gas passage therethrough and a valve adapted to control the flow of a liquified gas through said liquified gas passage;
   b. a shaft attached to and extending coaxially from said valve body, adapted to extend into said liquified gas container so as to be substantially opposed to the pull of gravity on said liquified gas container;
   c. a float slidably attached to said shaft, said float moveable between a first position and a second position as said liquified gas container is charged with said liquified gas;
   d. an electronic sensor positioned so as to sense the movement of said float from said first position to said second position, said sensor comprising an electric signal generator adapted to send an electrical signal;
   e. a controller adapted to perform, upon said electronic sensor sensing that said float has moved to said second position, at least one function selected from the group consisting of:
      i. initiating said electrical signal;
      ii. terminating said electrical signal; and
      iii. altering said electrical signal.

5. A float switch and fill controller according to claim 4 wherein said sensor comprises a reed switch.

6. A float switch and fill controller according to claim 4 wherein said sensor is integral with said valve body.

7. A float switch and fill controller according to claim 4 wherein said controller is adapted to control the power of said electrical signal.

8. A float switch and fill controller according to claim 4 wherein said valve body additionally comprises a pressure relief valve.

9. An apparatus for filling a liquified gas container, said apparatus comprising:
   a. a source of a liquified gas;
   b. a liquified gas conduit in liquified gas conductive connection with said source of liquified gas;
   c. a pump adapted to pump liquified gas through said liquified gas conduit into said liquified gas container;
   d. a valve body adapted to be sealingly attached to said liquified gas container so as to close said liquified gas container, said valve body having a liquified gas passage therethrough and a valve adapted to control the flow of a liquified gas through said liquified gas passage;
   e. a shaft attached to and extending coaxially from said valve body adapted to extend into said liquified gas container so as to be substantially opposed to the pull of gravity on said liquified gas container;
   f. a float slidably attached to said shaft, said float moveable between a first position and a second position as said liquified gas container is charged with said liquified gas;
   g. an electronic sensor disposed on said shaft, said electronic sensor adapted to sense the presence of said liquified gas; and
   h. a controller adapted to perform, upon said electronic sensor sensing contact with said liquified gas, at least one function selected from the group consisting of:
      i. initiating an electrical signal;
      ii. terminating an electrical signal; and
      iii. altering an electrical signal.

10. An apparatus according to claim 9 wherein said sensor comprises a device selected from the group consisting of optical sensors and electrical conductance sensors.

11. An apparatus according to claim 9 wherein said controller is adapted to control the power of said electrical signal.

12. An apparatus according to claim 9 wherein said valve body additionally comprises a pressure relief valve.

13. An apparatus for filling a liquified gas container from a source of liquified gas, said apparatus comprising:
   a. a source of a liquified gas;
   b. a liquified gas conduit in liquified gas conductive connection with said source of said liquified gas;
   c. a pump adapted to pump said liquified gas through said liquified gas conduit into said liquified gas container;
   d. a valve body adapted to be sealingly attached to said liquified gas container so as to close said liquified gas container, said valve body having a liquid gas passage therethrough and a valve adapted to control the flow of said liquified gas through said liquified gas passage;
   e. a shaft attached to and extending coaxially from said valve body adapted to extend into said liquified gas container so as to be substantially opposed to the pull of gravity on said liquified gas container;
   f. a float slidably attached to said shaft, said float moveable between a first position and a second position as said liquified gas container is charged with said liquified gas;
   g. an electronic sensor positioned so as to sense the movement of said float from said first position to said second position, said sensor containing an electric signal generator adapted to send an electrical signal, said sensor adapted to perform at least one function selected from the group consisting of:
      i. initiating said electrical signal upon sensing that said float has moved to one of said first and second positions;
      ii. terminating said electrical signal upon sensing that said float has moved to one of said first and second positions; and
      iii. altering said electrical signal upon sensing that said float has moved to one of said first and second positions.

14. An apparatus according to claim 13 wherein said sensor comprises a reed switch.

15. An apparatus according to claim 13 wherein said sensor is integral with said valve body.

16. An apparatus according to claim 13 wherein said controller is adapted to control the power of said electrical signal.

17. An apparatus according to claim 13 wherein said valve body additionally comprises a pressure relief valve.

* * * * *